Oct. 4, 1932.  J. F. LIVINGOOD  1,881,201
WHEEL ATTACHMENT FOR FRONT WHEEL DRIVE MECHANISM
Filed Feb. 17, 1930
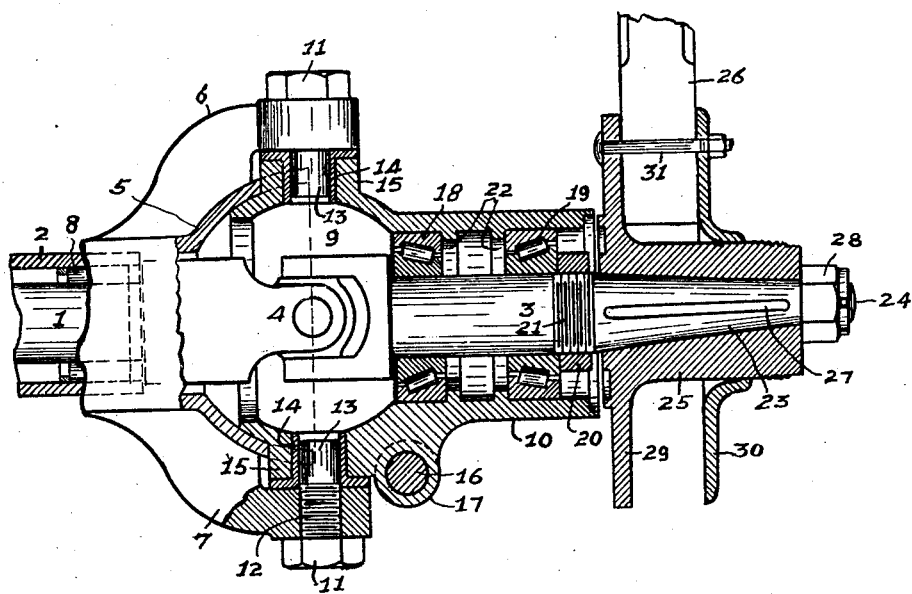
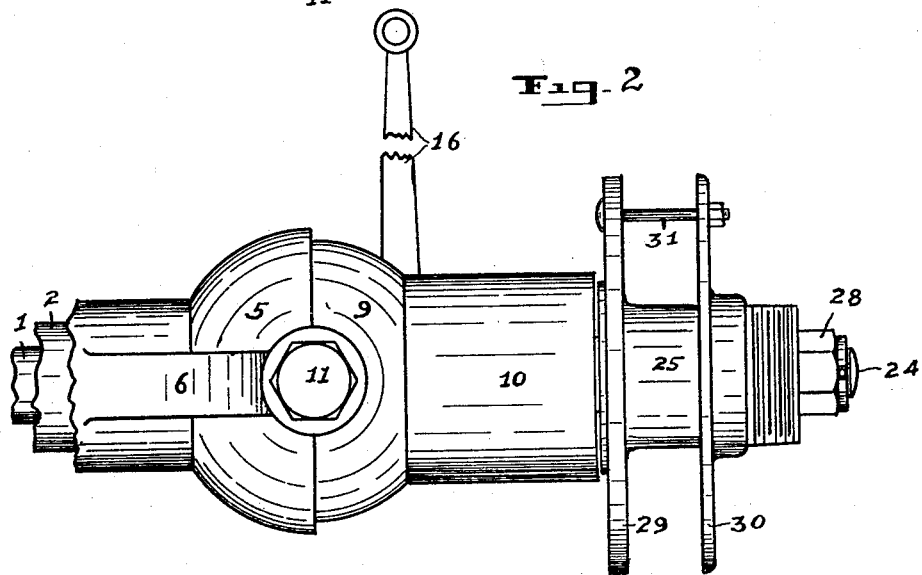
INVENTOR
Jesse F Livingood
By Jack R Snyder
Attorney.

Patented Oct. 4, 1932

1,881,201

UNITED STATES PATENT OFFICE

JESSE F. LIVINGOOD, OF WEST FINLEY, PENNSYLVANIA

WHEEL ATTACHMENT FOR FRONT WHEEL DRIVE MECHANISM

Application filed February 17, 1930. Serial No. 428,919.

My invention relates to a front wheel attachment for front wheel driven motor vehicles, and important objects thereof are to provide a substantial device of the character described, which will permit the simultaneous driving and steering of the front wheels, which is simple in its construction and arrangement, strong, durable and efficient in its use, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a longitudinal cross sectional view of a front wheel attachment embodying the invention.

Figure 2 is a top plan view thereof.

Referring in detail to the drawing 1 denotes an axle the inner end of which is operatively connected to a differential driving mechanism of the usual construction. The axle 1 is suitably enclosed in an axle tube 2 and has its outer end connected to an axle extension 3, by means of a universal joint 4, of any suitable construction.

The outer end of the axle tube 2 carries an enlarged, semi-spherical socket member 5, which is provided with a pair of integrally formed bearing ribs, indicated at 6 and 7. The bearing ribs 6 and 7 are respectively disposed at the top and bottom side of the socket member 5 at the outer side of the latter.

The socket member 5 is rigidly fixed in position, in any suitable manner, to the outer end of the axle tube 2. The latter carries bearing rollers 8 for journaling the outer end of the axle 1 directly inward of the universal joint 4.

A ball member 9 is pivotally mounted in the socket member 5, and includes an integrally formed, tubular, bearing housing 10, which extends outwardly therefrom.

The ball member 9 is pivotally connected in the socket member 5 by a pair of similar connecting bolts 11. The connecting bolts 11 are threadedly fixed, as at 12, in the outer ends of respective bearing ribs 6 and 7, and have their inner ends 13 journaled for rotation in bushings 14, which are fixed in respective bosses 15. The latter are formed integral with the outer periphery of the socket member 5, and are diametrically opposed relatively to each other.

A steering arm 16 is fixed in a boss 17, which is integrally formed at the lower side of the ball member 9 adjacent to the lower connecting bolt 11. The steering arm 16 extends rearwardly approximately at right angles with respect to the longitudinal disposition of the axle 1, and is adapted for connection with the steering apparatus of the motor vehicle in the usual manner well known in the art.

The connecting bolts 11, and the universal joint 4, are all arranged in concentric vertical alignment and in consequence when the steering arm 16 is shifted corresponding movement will be imparted to the ball member 9 in the socket member 5 to effect the steering operation.

The axle extension 3 is journaled for rotation in a pair of spaced roller bearings 18 and 19, which are suitably fixed in the bearing housing 10. The roller bearing 18 is disposed adjacent to the universal joint 4 and the moving portion of the former abuts against the latter. The roller bearing 19 is disposed adjacent to the outer end of the bearing housing 10, and the moving portion thereof is engaged by a ring nut 20, which is mounted on the threaded portion 21 of the axle extension 3.

The adjacent ends of the fixed portions of the roller bearings 18 and 19 abut against respective annular shoulders 22 formed integral with the inner periphery of the bearing housing 10. The adjustment of the ring nut 20 on the axle extension 3 properly secures the latter in respective roller bearings 18 and 19.

The axle extension 3 extends through the bearing housing 10 and projects from the latter. Such projecting portion is formed to provide a tapering connecting portion 23 and a threaded end portion 24.

The hub 25, of the motor vehicle wheel 26, is keyed, as at 27, to the tapered axle extension portion 23, to rotate with the latter, and is fixed in position thereon by a nut 28 engaged on the threaded end portion 24.

The hub 25, comprises an inner flanged member 29 and an associated outer flanged member 30. The outer flanged member 30 overlaps the inner flanged member 29 and is securely clamped to the latter by bolts 31. The clamping action of the bolts 31 further serve to secure the wheel 26 to the hub 25 in the usual manner.

The rotation of the axle 1 and the associated axle extension 3 will drive the vehicle wheel 26, as the hub 25 is keyed to the axle extension 3, and is permitted to rotate freely in the roller bearings 18 and 19.

It will be noted that the entire vehicle wheel 26 is carried by the ball member 9 and the latter being shiftable on its connection in the socket member 5, as herein stated, the vehicle wheel 26 is permitted to rotate freely during the steering operation.

The device is suitably lubricated to assure its efficient operation, and the construction of the socket and ball members 5 and 9 are particularly adapted for lubrication purposes.

The present invention provides a most efficient and substantial device for permitting the simultaneous driving and steering of the front wheels of a motor vehicle.

What I claim is:

In a front wheel drive mechanism for motor vehicles, the combination of an axle tube, a driving shaft extending through said tube and journaled for rotation in the latter, an integrally formed socket member including a pair of apertured bearing ribs and being fixed to the outer end of said tube member, a ball member including a pair of apertured bosses and being mounted in said socket member, a bushing mounted in each of said apertured bosses, a connecting bolt threadedly fixed in each of said bearing ribs and pivotally engaging in respective bushings, a bearing housing formed integral with said ball member and projecting outwardly from the latter, an axle extension connecting for universal movement with the outer end of said driving shaft and extending through said bearing housing, means for fixedly connecting the front wheel to the outer end of said axle extension, and bearing elements mounted within said bearing housing and on said shaft extension and providing a bearing for the latter.

In testimony whereof I affix my signature.

JESSE F. LIVINGOOD.